US 11,223,862 B2

(12) United States Patent
Vaderna et al.

(10) Patent No.: US 11,223,862 B2
(45) Date of Patent: Jan. 11, 2022

(54) CONTROLLED UPLINK ADAPTIVE STREAMING BASED ON SERVER PERFORMANCE MEASUREMENT DATA

(71) Applicant: Telefonaktiebolaget LM Ericsson (publ), Stockholm (SE)

(72) Inventors: Peter Vaderna, Budapest (HU); Mate Cserep, Budapest (HU); Bence Formanek, Budapest (HU)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/766,851

(22) PCT Filed: Nov. 28, 2017

(86) PCT No.: PCT/EP2017/080670
§ 371 (c)(1),
(2) Date: May 26, 2020

(87) PCT Pub. No.: WO2019/105528
PCT Pub. Date: Jun. 6, 2019

(65) Prior Publication Data
US 2020/0322663 A1 Oct. 8, 2020

(51) Int. Cl.
*H04H 60/33* (2008.01)
*H04N 21/24* (2011.01)
(Continued)

(52) U.S. Cl.
CPC ....... *H04N 21/2408* (2013.01); *H04L 65/608* (2013.01); *H04L 65/80* (2013.01);
(Continued)

(58) Field of Classification Search
CPC ......... H04N 21/2408; H04N 21/23116; H04N 21/234381; H04L 65/608; H04L 65/80
See application file for complete search history.

(56) References Cited

U.S. PATENT DOCUMENTS

2015/0281305 A1* 10/2015 Sievert ................ H04N 19/46
709/219
2016/0189421 A1 6/2016 Haimovitch-Yogev et al.
(Continued)

FOREIGN PATENT DOCUMENTS

WO 2016205674 A1 12/2016

OTHER PUBLICATIONS

Bilal, Kashif, et al., "Crowdsourced Multi-View Live Video Streaming using Cloud Computing", IEEE Access; vol. 5, Jul. 7, 2017, pp. 12635-12647.

*Primary Examiner* — Mulugeta Mengesha
(74) *Attorney, Agent, or Firm* — Murphy, Bilak & Homiller, PLLC

(57) ABSTRACT

The invention relates to method and system (1) for centrally controlling uplink streaming from a plurality of devices (D) to a server (S) for data processing. The method comprises to centrally measure (S10) performance of data processing for providing a performance measurement result (r). The method continues to be executed on the device (D) by providing (D12) a control instruction (ci), which is based on the performance measurement result (r) for controlling (D13) uplink streaming parameters for sending data to the server (S).

10 Claims, 6 Drawing Sheets

(51) Int. Cl.
*H04L 29/06* (2006.01)
*H04N 21/231* (2011.01)
*H04N 21/2343* (2011.01)

(52) U.S. Cl.
CPC .............. *H04N 21/23116* (2013.01); *H04N 21/234381* (2013.01)

(56) References Cited

U.S. PATENT DOCUMENTS

2016/0277664 A1* 9/2016 Mangold .......... H04N 21/21805
2017/0155870 A1* 6/2017 Zetterlund ............... H04N 7/15
2018/0139258 A1* 5/2018 Margolin ......... H04N 21/44227
2020/0218690 A1* 7/2020 Huston ................ G06F 16/954

* cited by examiner

CONTROLLED UPLINK ADAPTIVE STREAMING BASED ON SERVER PERFORMANCE MEASUREMENT DATA

TECHNICAL FIELD

The present invention relates to controlling uplink streaming of image data from a plurality of client devices for the purpose of data processing on a central server.

BACKGROUND ART

Automated processing of image data is relevant for different applications, like object recognition, motion estimation, photogrammetry, image segmentation, optical flow, applications in Augmented Reality (AR) or Mixed Reality (MR), robotic vision, Unmanned Aerial Vehicle (UAV) control, surveillance etc.

It is a common use-case to collect images from multiple sources and perform the image processing on a central entity. Examples are surveillance camera analysis, central robotics control, based on the images taken by the moving robots, traffic control based on fixed cameras on the street and dash cameras in the cars.

In most cases the data is shared via wireless network, partly because it is cumbersome and costly to plug network wires into all devices and partly because for some devices it is impossible to plug in wires, e.g. for moving robots, self-driving cars, UAVs. Image processing systems and services are special services having strict requirements for the network bandwidth, latency and computing. The next generation of cellular networks (5G) and edge computing enable for hosting and managing these services.

Due to the large size of image data, sending images or video streams usually generate high amount of traffic and significantly loads the network. Thus, in prior art systems, the resources for processing may become over-utilized. Moreover, due to their complexity the computer vision and image processing algorithms require extra amount of hardware resources (CPU, GPU, memory).

When there are many devices capable of capturing visual and spatial data (cameras or Light Detection and Ranging devices (LIDARs)) at the same place, all devices sending high resolution images or 3D point clouds to e.g. an edge cloud, one will soon face limitations of the system. The uplink channel might become overloaded, the CPU/GPU might get over-utilized or the memory might get full. Thus, in known systems of state of the art, the server-related resources may become over-utilized which in turn leads to drawbacks with respect to performance of central processing on the server.

In state of the art adaptive streaming solutions are known for control of the downlink stream, e.g. mainly used for video playback for humans, where e.g. the framerate should not be less than a lower threshold (24 frames/sec). Thus, adaption is applied in the downlink direction where the video is played on the device. Moreover, these solutions relate to adaptation or adaption of individual downlink streams with respect to parameters or capabilities of the client (e.g. bitrate, resolution, framerate).

Solutions according to state of the art lack flexibility in a way that the image and point cloud settings in the device are usually not matched with the server's processing demand. If, e.g., low latency is not required in the image processing algorithm, it is unnecessary to send images with high framerate.

Moreover, when streams are generated by multiple cameras or sensors, a lot of redundant information is sent to the cloud.

SUMMARY OF THE INVENTION

Therefore, an object of the present invention is to improve known streaming systems and to overcome the drawbacks of state of the art systems, mentioned above. In particular, it should be possible to adapt uplink streaming controlled centrally where streaming data is processed on the server by automated processes. The amount of traffic and the amount of computation should be reduced by diminishing redundancy.

This object is achieved by the independent claims. Advantageous features and embodiments are mentioned in the dependent claims and in the description.

According to a first aspect, the invention relates to a method for controlling uplink streaming, in particular for centrally controlling uplink streaming, from a plurality of devices to a server for data processing. The method is to be executed on the server and comprises to centrally measure performance (preferably in the form of performance parameters) of data processing (in particular image processing) for providing a performance measurement result. The performance measurement result is used for providing a control instruction for controlling uplink streaming for the plurality of devices.

The method may be continued to send the performance measurement result to the devices. The devices, in turn, may be adapted to calculate a control instruction, which is based on the performance measurement result. The control instruction may be used for controlling the uplink streaming parameters for sending (streaming) data to the server.

The invention is based on the idea to adapt the uplink data exchange process, sending (in particular image) data from a local device to a server, based on performance requirements of the server, which is adapted to process the received data. Further, especially for the use case, where the image data, which are detected on several distributed located devices, represent at least partially overlapping areas and thus are partially redundant, the sending of redundant data should be reduced.

According to a preferred embodiment the control instruction is provided by applying an adaption algorithm, which is based on a set of pre-definable rules, assigning uplink streaming parameters to pre-definable thresholds of performance measurement data, representing a server workload level. This has the advantage to adapt the control dynamically to actual server workload. Preferably, the rules may be adaptable also during runtime of the system. So, the method is flexible and may be amended easily even during runtime.

In a preferred embodiment, the adaption algorithm applies application level metrics. The application may be implemented on the server to process the device data. The application level metrics may comprise a latency of mesh generation/mesh update. Second, the application level metrics may comprise the redundancy of the image information provided by the set of devices, which can be measured (e.g. in percentages: the ratio of the scene already covered by other camera sensor devices). A third option for the application level metrics would be to measure end-to-end latency, i.e. the time from taking the picture on the device to the corresponding mesh update (or other application) on the server.

According to another preferred embodiment, the performance measurement result is transferred to the device and thereinafter on the device the adaption algorithm is applied in order to generate the control instruction locally on the device. With this feature, the local device is provided with more information relating to the processing of its data on the server.

According to another preferred embodiment, the performance measurement result is processed on the server by applying the adaption algorithm in order to generate the control instruction centrally on the server for the respective device and wherein the control instruction is sent to the device. This has the advantage that resources of the server may be used for processing the measurement result and to save bandwidth by only transmitting a control instruction which usually is a small subset.

According to another preferred embodiment, the uplink streaming parameters are controlled in a dedicated manner specifically for each of the devices. This makes the system and method more adaptive to the particular issues, conditions and states of the devices, which may differ from device to device.

According to another preferred embodiment, the control instructions for controlling the uplink streaming parameters are calculated in a coordinated manner for all of the devices, based on a prioritizing algorithm, which reduces the amount of redundant information to be received by the server from the different devices. The prioritizing algorithm is adapted to analyse how redundant the data are received from the devices, being located differently and based on this analysis, the devices are prioritized and the control instructions for the particular devices are set differently. This makes it possible not only to decide on the side of the server: Is the new data redundant or not—but also to decide, if there is more than one redundant data set and if yes, how to prioritize the different devices, e.g. depending on predefined rules, including e.g. "the device which is connected via a high bandwidth connection should send data with higher framerate and vice versa". The prioritizing algorithm is needed here to select the devices to send higher or lower framerates. Several approaches are possible to prioritize the sending of the devices. A first approach is to go over the devices in a round-robin manner (in random order) and to analyse the aggregated information. In case it turns out that the information provided by a given device has already been acquired in the same loop or session, then that device is judged to be redundant. It is also possible to set up a particular (not random) order of the devices here (e.g. take the fixed cameras first, then the mobile ones).

According to another preferred embodiment, the prioritizing algorithm is based on a three-dimensional mesh model, which is dynamically calculated from the received data, in particular from the point clouds of the devices, being located differently. The 3D mesh represents the surface model of the world. It may be represented by polygons, usually triangles, sometimes called polygonal or triangular mesh. It is built up and updated centrally, based on the data coming from the devices looking at the scene from multiple views. If the point cloud perceived by one particular device is completely overlapping with the mesh, then that device is considered to generate redundant data. With this, the redundancy decision may be automated completely and may be calculated in a consistent manner for all scenarios uniformly.

According to another preferred embodiment, the performance is measured by measuring performance parameters, which are selected to represent a load condition at the sever. This makes it possible, to adapt local control instructions on the device for sending data in dependence of (i.e. being based on) the actual performance conditions on the server.

According to another preferred embodiment, the performance is measured by analysing a time stamp which was included in the data stream by the device. This has the advantage that further data processing may be executed. In particular, statistical analysis may be executed in order to adapt to specific time phases with much or less traffic (e.g. during day or night).

Moreover, in another preferred embodiment, the performance is measured by measuring a runtime or execution time for data processing on the server. This has the advantage that always actual real data are considered as a basis and no estimations.

Further, in another preferred embodiment, data comprise image data and thus data processing refers to or comprises image processing and the uplink streaming parameters comprise a bitrate, a resolution, a field of view and/or a framerate. These main uplink streaming parameters are to change for back-pressure of workload on the server. It is possible to change the encoding format (e.g. H.264, H.265) since it has some impact on the compression. However, changing it from time to time would imply more complexity (e.g. it should be synchronously changed in both ends). An optional additional parameter would be colour format or colour resolution (e.g. 4:2:0 vs 4:4:4), or in extreme case changing from coloured video stream to grey-scale. This parameter, however, is only valid for an RGB stream (RGB: red-green-blue), not for a point cloud stream.

Finally, in another preferred embodiment, the data comprise depth information which is to be streamed as a three-dimensional point cloud from the plurality of differently located devices to the server and wherein data processing comprises an augmented reality processing on the server.

In another aspect the invention also refers to a method which is to be executed on each of the devices. The method is for controlling uplink streaming from a device of a plurality of devices to a central server for data processing. The method comprises the step of receiving a performance measurement result, in particular from the server. The method further comprises the step of providing or calculating a control instruction, which is based on the performance measurement result for controlling a setting of uplink streaming parameters for sending data to the server.

In a preferred embodiment, the uplink streaming parameters comprise a bitrate, a resolution, a framerate and/or a field of view.

According to a preferred embodiment, an adaption algorithm is executed on the device to set the uplink streaming parameters for sending data to the server. In an alternative preferred embodiment, the adaption algorithm may also be executed centrally on the server. In this case, the control instruction are calculated centrally on the server and will be forwarded to each of the devices for local execution.

In another aspect the invention also refers to a system for centrally controlling uplink streaming. The system comprises at least one server which is adapted to execute at least a part of data processing, wherein the data are received from a plurality of devices, wherein the server comprises a performance measurement unit, wherein the performance measurement unit is adapted to centrally measure performance during data processing for providing a performance measurement result. Moreover, the system comprises the plurality of devices, wherein each of the devices comprises a streaming unit, which is adapted for uplink streaming, and wherein each of the devices or the streaming unit comprises a controller, which is adapted to control the setting of parameters for uplink streaming according to the performance measurement result of the performance measurement unit.

In another aspect the invention refers to a server for use in a system as mentioned before. The server is adapted to execute at least a part of data processing, wherein the data are received from a plurality of devices, wherein the server comprises a performance measurement unit, wherein the performance measurement unit is adapted to centrally measure performance during data processing for providing a performance measurement result to be prepared for transfer to the devices.

Another aspect of the invention relates to a device for use in a system as mentioned before. The device comprises a streaming unit, which is adapted for uplink streaming, and wherein each of the devices or the streaming unit comprise/s a controller, which is adapted to control the setting of parameters for uplink streaming according to the performance measurement result of the performance measurement unit.

The invention in particular the method may be provided as a computer program loadable into a processing unit of a device and/or a server, the computer program comprising code adapted to perform the steps of a method as mentioned before when processed by the processing unit. The computer program may be stored on a computer readable medium or data carrier, like a memory stick. The computer program may also be downloaded in downloadable form from a server entity.

DETAILED DESCRIPTION

Figure 1:
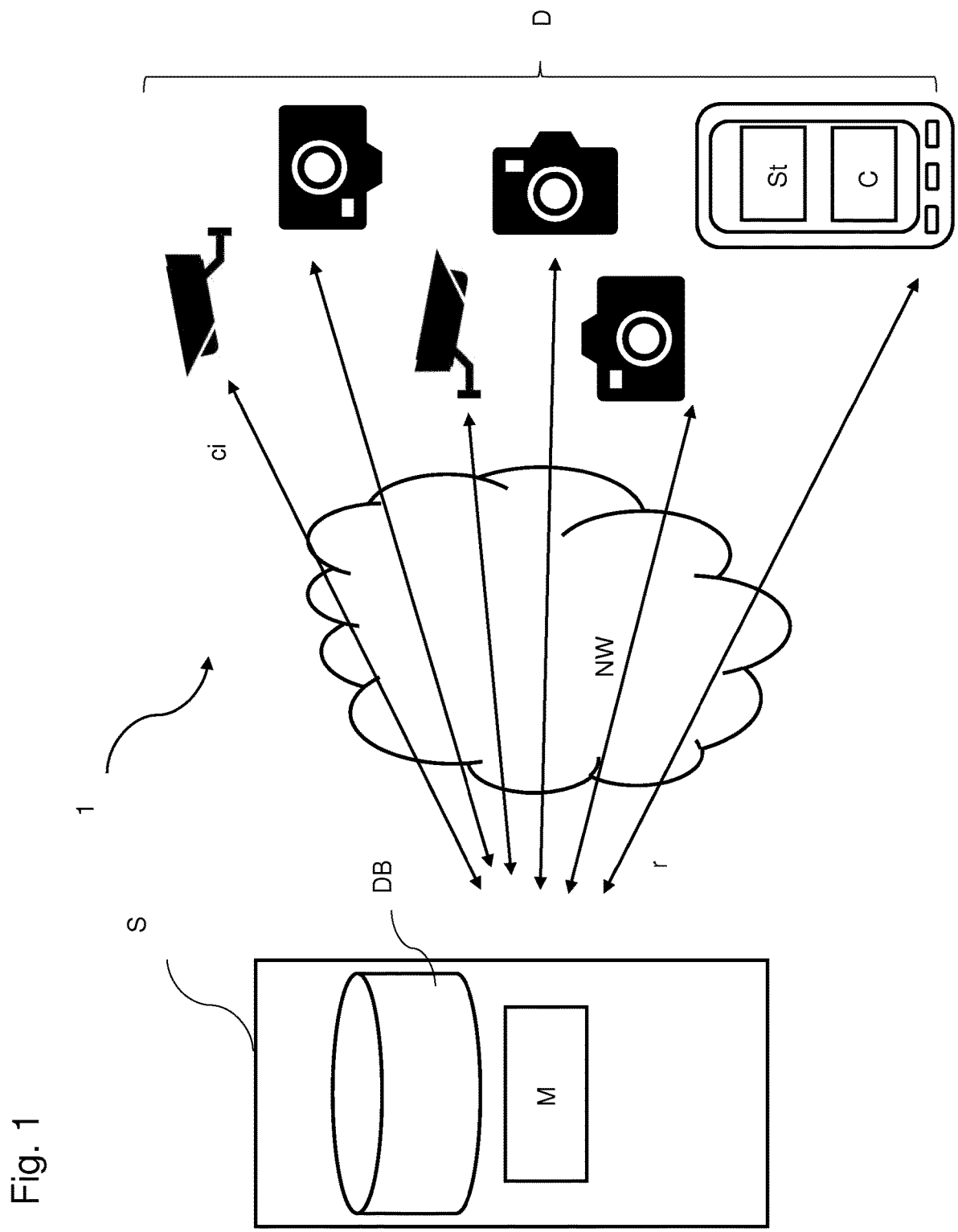
FIG. 1 shows a schematic representation of a system for control of uplink streaming from a device to a server in an exemplary embodiment of the present invention.

In the following a short definition of terms is given.

The present invention relates to uplink streaming of data. "Uplink" in this context refers to sending or transmitting data from an entity to a server. In a typical embodiment, data is gathered on a plurality of distributed devices. The data may be generated on and/or by each of the devices. For this reason, the devices may be equipped with data detection means, comprising cameras, sensors, microphones etc. The data are to be processed centrally on a server.

The server is a computing entity which is adapted to process the data from the devices. The server may be deployed as a network of servers in a distributed manner. Moreover, the server may be provided in a virtualized manner.

The data are collected and aggregated from a plurality of devices, which are located at different locations. The data may relate to image data, detected by cameras and optical sensors and, thus data processing, in particular, refers to image processing.

The uplink streaming process is to be controlled dependent of the processing status on the server, comprising workload, memory capacity etc. With other words, the uplink streaming process and thus the sending of data, which is triggered by the device, is controlled with control parameters which are detected and measured on another entity namely on the server. By contrast, in state of the art systems downlink streaming (in direction to the local client device) is controlled by client-specific parameters (client capacity, resolution etc.).

The uplink streaming process is triggered locally at the device, whereas the measurement of performance parameter which are used as control parameters is executed centrally on the server.

The term "providing a control instruction" may be construed as locally calculating a control instruction on the device for controlling the setting of parameters for uplink streaming according to and/or based on the performance measurement result. The step of providing or calculating the control instruction may be implemented by executing the adaption algorithm. The adaption algorithm is a computer implemented process for transforming the performance measurement result into at least one control instruction to be applied for uplink streaming. The adaption algorithm may be construed, as described in more detail below and in the context of two different embodiments (execution on the central server or execution on the local device). For example, in a preferred embodiment, the adaption algorithm is executed on the server and the control instructions are provided centrally on the server for each of the devices of the plurality of devices. The control instructions are provided for each of the devices in a dedicated manner. So, a first control instruction is provided for a first device, a second control instruction is provided for a second device and so on. The control instructions may differ from device to device. In some scenarios, however, the control instructions may be the same for a group of devices (e.g. devices, located in a similar area). The provided control instructions are to be prepared for being transferred to the devices. Due to detected redundancy or priority, some devices will receive a performance measurement result, indicating that no data should be sent to the server at all and others will receive a performance measurement result, indicating to send data with specifically adapted (or set) parameters, e.g. with high priority or low priority. In the case, where the a performance measurement result for a specific device, for example, indicates that no data should be sent at all, the device will suspend, interrupt or stop the sending of streaming data. In this case the control instruction will be an instruction to suspend, interrupt or stop the streaming process. In other cases, the control instructions will modify the set of sending/streaming parameters. Further, in other cases, the control instructions will maintain the actual or initial set of sending/streaming parameters unchanged.

The device is a physical or an electronic apparatus which sends locally detected or generated or locally provided data to the server under particular conditions (e.g. in certain time phases or if new data is present or if the amount of new data is above a pre-defined threshold. According to a preferred embodiment, the device is or comprises a module for detecting optical data, like a camera a light detection and ranging device—LIDAR. The detected data on the device may be optical data, like two dimensional and/or three-dimensional data, i.e. images, video streams and/or point clouds.

The performance is measured on the server during data processing of the received streaming data. The performance may be represented in pre-definable performance parameters. The performance measurement provides a performance measurement result. The performance measurement result may be formatted in a string (e.g. xml). The performance measurement result may comprise different sections, representing the different parameter values, for example a section for memory consumption, for CPU (central processing unit) usage or for usages of hardware resources of the server (e.g. CPU, GPU) etc. Thus, the performance measurement result may represent a metric, which reflects the resource consumption or usage on the server for a set of pre-defined server resources. The invention suggests to select an appropriate performance measurement process, selected from a set of pre-defined performance measurement processes.

The control instruction is dynamically calculated and serves to control the uplink streaming parameters for sending data from the device to the server. The calculation of the control instruction is based on the performance measurement result. The control instruction preferably is device-specific, so that a first device will receive a first control instruction and a second device a second control instruction, which might be different. The control instruction may for example set the framerate for data transmission, resolution parameters, sending frequency etc. The control instructions may be used to change or adapt an initial set of sending parameters (for the uplink stream). The control instruction may be used to change back-pressure of workload on the server. The term "back-pressure" should be construed as relating to data processing in a communication system consisting of a sender and a receiver where the receiver cannot process the amount of data sent by the server. Back pressure is a method where the receiving side indicates to the server that it is unable to process the incoming data and the server adaptively decreases the amount of data flow. An example for back pressure is e.g. TCP (Transmission Control Protocol) in networking: the receiver sends acknowledgements for every packet it received, and the server stops transferring data if the number of unacknowledged packets reaches a certain limit (congestion window).

The adaption algorithm is applied to calculate the control instructions as a result. The adaption algorithm serves to adapt the settings in the device to send its data to the server. The settings are adapted in correspondence to demands and/or technical requirements of the processing on the server (i.e. of an application for processing the streaming data on the server). The adaption algorithm is based on a set of pre-definable rules, assigning uplink streaming parameters to pre-definable thresholds of performance measurement data, representing a server workload level. For example, if low latency is not required by the image processing application on the server, it is unnecessary to send the images with high framerate. Thus, in this case, the rule would be as mentioned before and the control instruction would reduce the framerate accordingly.

According to a first embodiment, the adaption algorithm is executed completely on the device. The control instruction will, then, be generated locally on the device, too and may be implemented directly on the device for the actual stream to be sent to the server.

According to a second embodiment, the adaption algorithm is executed completely on the server. The control instruction will be generated on the server and will be transmitted to the device for being implemented and put into practice there. This has the advantage to save processing power and resources on the device.

The prioritizing algorithm is executed on the server for a set of devices in a coordinated manner for all of the devices of the group. The prioritizing algorithm may serve to calculate specific control instructions for each of the devices, in order to reduce the amount of redundant data, received from the different devices. The prioritizing algorithm may analyze how redundant the data is, which are received from the differently located devices. Different methods may be used in order to analyzes how redundant the data is. For example, data which are received from a first video camera (first device) are analyzed in combination or comparison to data which are received from a second video camera (second device). If the analysis reveals that the represented area or volume is nearly identical or has overlappings within a predefined threshold, the received data are judged to be redundant; otherwise (no overlappings) not. In case of redundancy, only one device may be selected to stream the data at all or the other device may be instructed to transmit the stream with lower priority (e.g. with lower framerate). Thus, the devices are prioritized and the control instructions for the particular devices are set differently. The prioritizing algorithm is executed on the server.

One of the main problems, targeted by a preferred embodiment of this invention is to handle overload scenarios in image processing cloud services—that are processing many video streams from multiple sources (in the following mentioned as devices D) at the same time—in a central and coherent way. For processing, an application may be implemented on a central server S.

An adaption algorithm is proposed for real-time image processing systems and services to set limits in devices D for sending the images, video stream or point cloud stream based on application-level indications. The limitation is enforced by setting certain parameters in the image, video stream or point cloud sending mechanism such as bitrate, resolution, framerate or field of view. An initial value of these parameters is set at the start of the server's image processing application. Then, the service performance is monitored in parallel with the normal operation of the application. When the service performance gets below a certain threshold, back-pressure is applied by adapting one or more of the sending parameters (bitrate, resolution, framerate or field of view).

The parameter to change and the amount of change depends on application preferences, application priority and the performance degradation. This way streaming from multiple sources can be controlled in a coherent way to reduce redundancy. As soon as the performance gets to an acceptable level again, the parameters may be set to their initial value.

FIG. 1 shows an overview of a system 1 for centrally controlling uplink streaming. Multiple and various devices D take vision data (images/video streams/3D point clouds) simultaneously or in different or overlapping time phases of the physical environment. The vision streams are sent to the server S and processed by the image processing application, implemented thereon.

It is possible to control the streaming parameters for the streams on the respective devices D from the server S. For example, the bitrate, the resolution of the images/point clouds, the framerate of the video stream can be set remotely, namely by the server S. In this way it is possible to apply a centrally optimized adaption algorithm that balances the streaming parameters between the streams, considering the actual state of the server's processing.

As depicted in FIG. 1, the devices may be of different type. They may comprise of cameras, smartphones, surveillance cameras, which are located at different positions and may be directed to different areas and/or volumes, optical sensors etc. This should be represented in FIG. 1 on the right side by showing the cameras in different orientations. The central server S may comprise a database DB. Alternatively, the database DB may be provided as external source with data connection to the server S. For executing the control of uplink streaming, the server S comprises a measurement unit M, which is adapted to measure performance of the image processing on the server S. The measurement unit M has an output interface (not shown) for outputting a result r (the measured performance). The measurement may be executed according to predefined rules (set in the database DB, e.g. dynamically and automatically during runtime of the application or at several time phases or based on special conditions, for example, if runtime becomes lower than a predefined threshold). The device D, in turn, comprises a streaming unit St, which is adapted for uplink streaming. Further, all or selected devices D comprise(s) a controller C, which is adapted to control the setting and adaption of parameters for uplink streaming according to the performance measurement result r of the performance measurement unit M.

Figure 2:
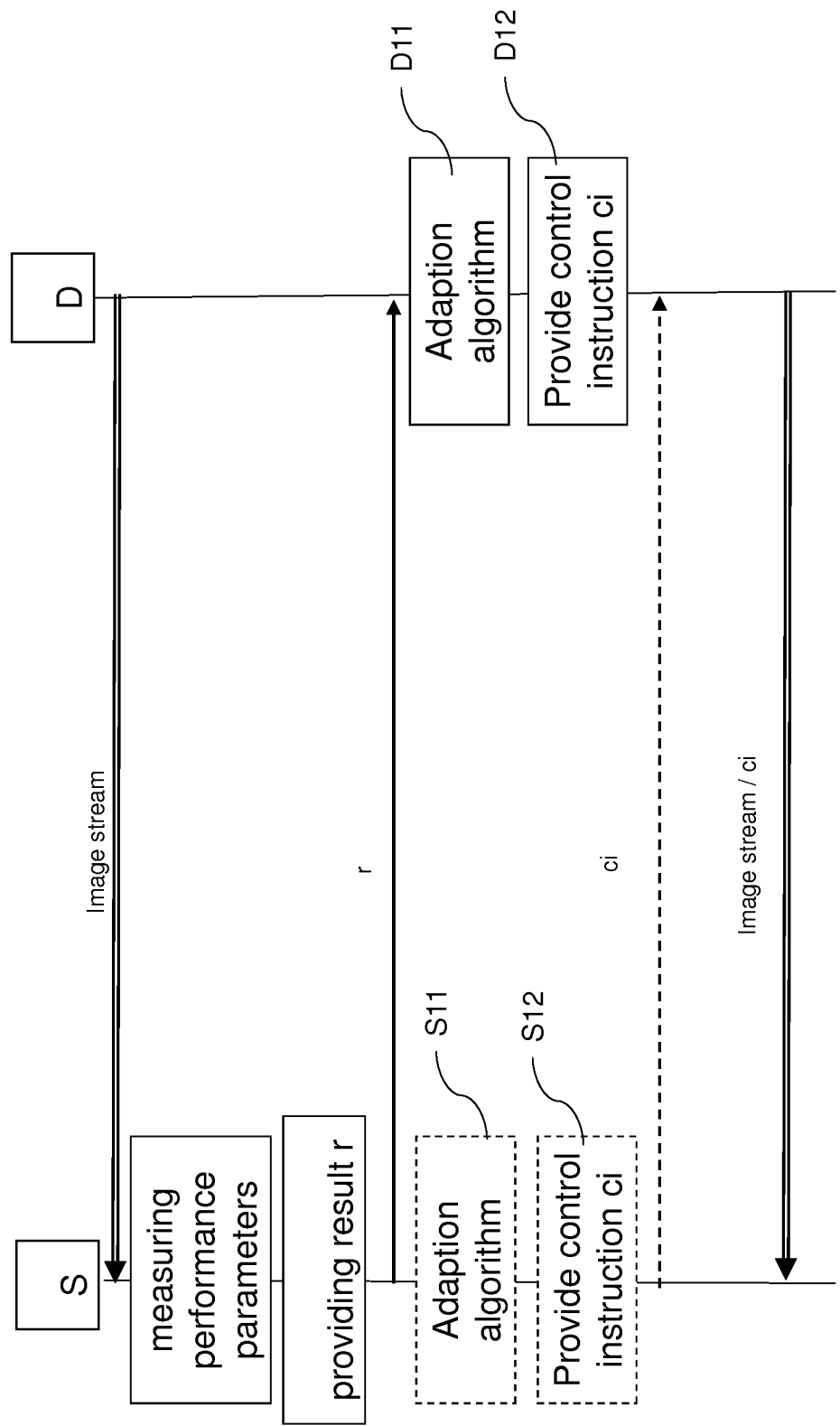
FIG. 2 is an interaction and sequence diagram, showing interactions between a device and a server according to a preferred embodiment of the invention.

FIG. 2 shows several different embodiments of the method in an overview manner and steps which are executed on the device D and on the server S. During operation of the image processing application on the server S, images are captured on the multiple devices D and all these image data are sent to the server S for processing. FIG. 2 only shows one single device D representatively for the ease of illustration. The measurement and adaption method according to the invention is executed in parallel with the (unadapted) uplink streaming of data. In FIG. 2 this should be represented by the first double arrow from the device D to the server S. It should be noted that the process of sending image data is a continuous process. The performance is measured in order to provide a performance measurement result r. The result r is transferred to the respective device D for the purpose of controlling the streaming process.

According to a first embodiment, the adaption algorithm may be executed locally in step D11 on the device D in order to locally provide control instructions ci in step D12 to control (adapt or maintain) the present streaming parameters. The control instructions ci are executed locally on the device D. This refers to the solid line rectangles on the device-side (right). After this, the streaming may start with the newly set streaming parameters ci, depicted in FIG. 2 with the double arrow at the bottom line, indicated with reference numeral 'image stream/ci'.

According to a second embodiment, the adaption algorithm may be executed in step S11 on the server S in order to centrally provide the control instructions ci in step S12 to control the present streaming parameters. This refers to the dashed line rectangles on the server-side (left). The control instructions ci have first to be transferred to the respective device D, before they are executed locally on the device D. After this, the streaming may start with the newly set streaming parameters ci, as in the first embodiment.

Figure 3:
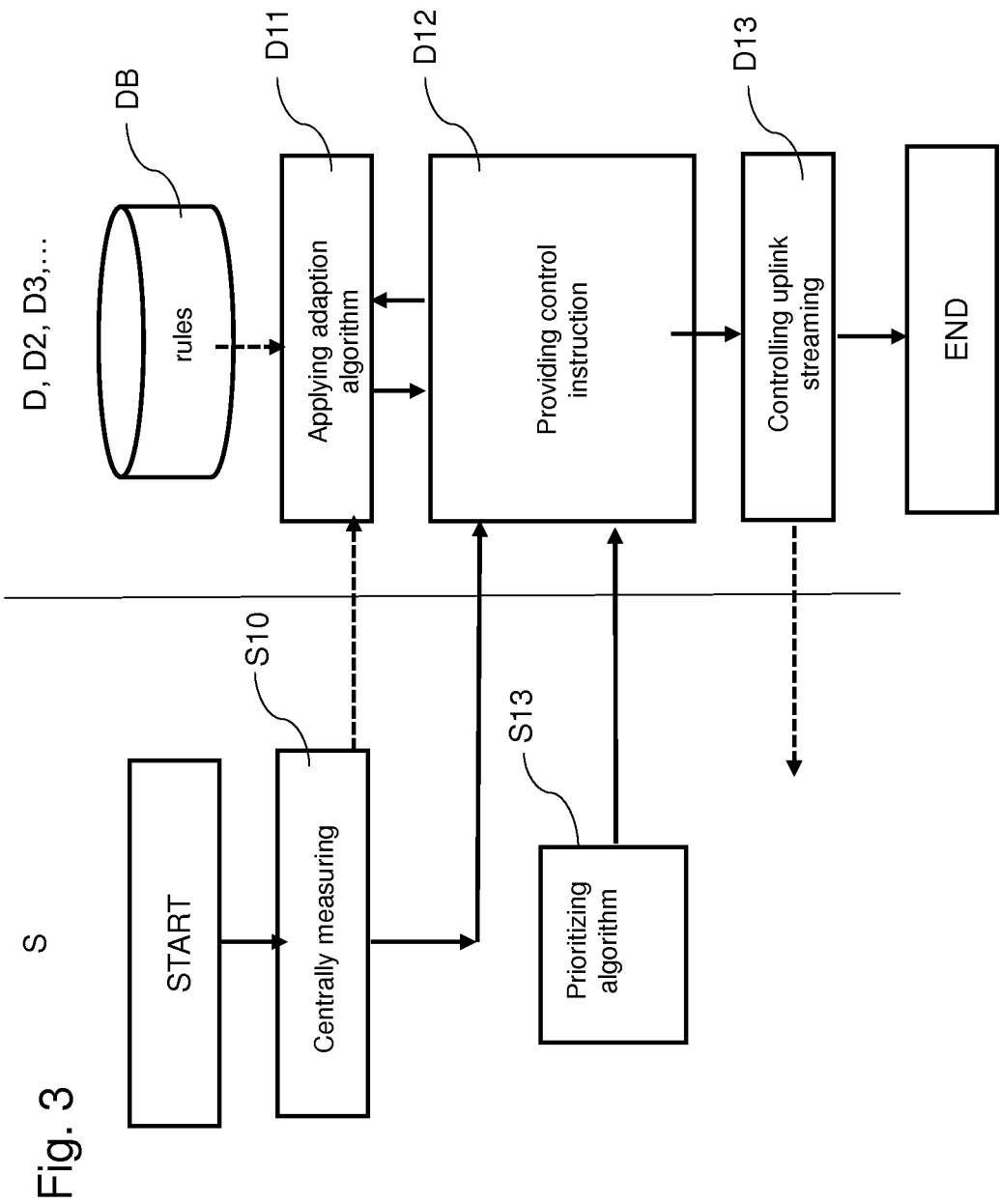
FIG. 3 is a flow chart of a method according to a preferred embodiment of the present invention showing different alternative embodiments.

FIG. 3 shows a flow chart of the method of adapting uplink streaming parameters according to the server's workload and resources. After starting the method, in step S10 the performance is centrally measured at the server S.

According to the first embodiment, which has already been described with respect to FIG. 2, the adaption algorithm is executed in step D11 on the device D in order to locally provide the calculated control instructions ci in step D12. The control instructions ci are used in step D13 to control uplink streaming. After this the method may be executed iteratively or may end.

According to the second embodiment, the adaption algorithm is executed on the server in step S12 (not shown in FIG. 3).

In step S13 a prioritizing algorithm may be applied on the server S. Input for the prioritizing algorithm is the measured performance r and the image data streams, received from the set of devices D. An output is the control instructions ci, which are computed with the prioritizing algorithm. The prioritizing algorithm will be explained in more detail below with respect to FIG. 5.

Figure 4:
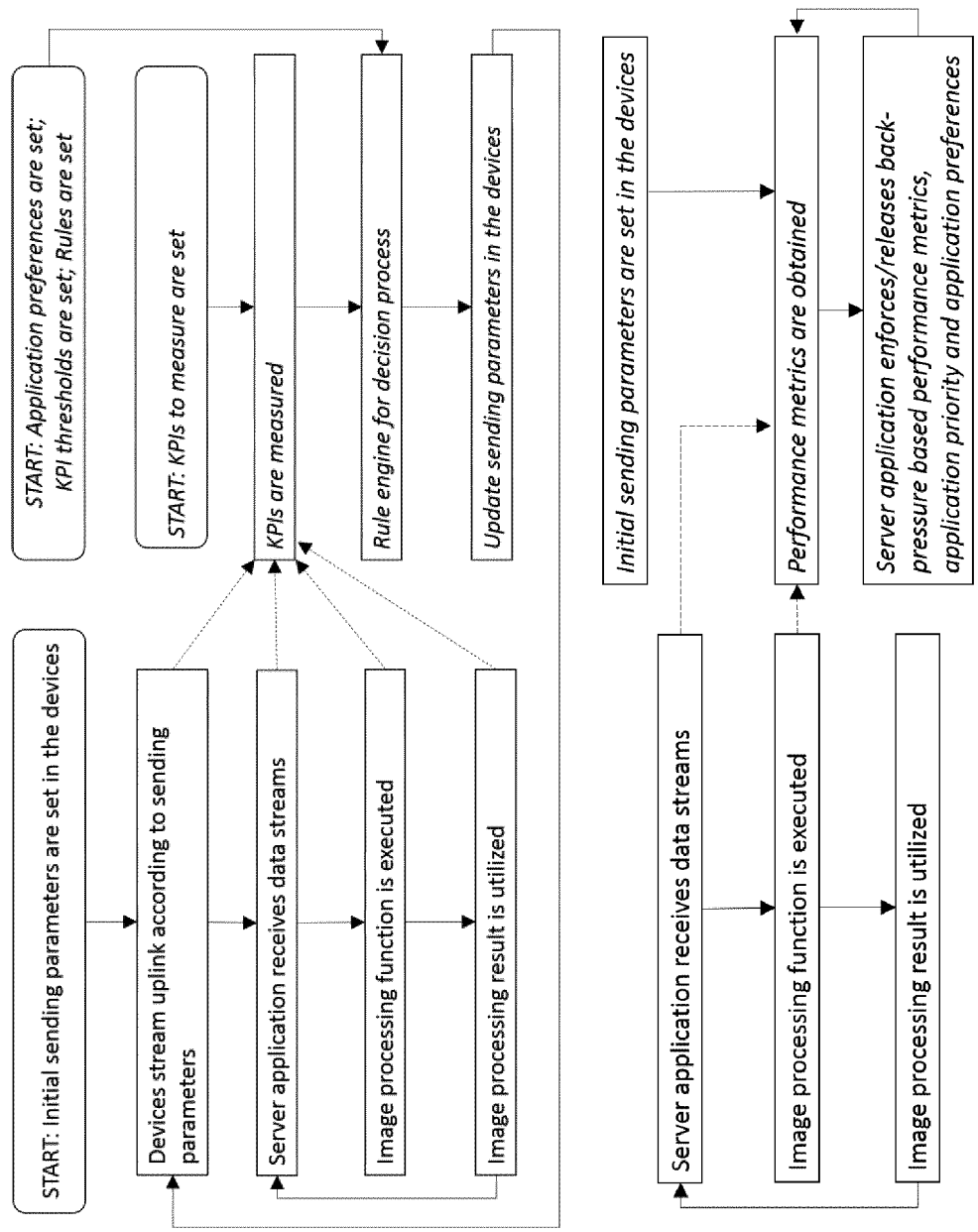
FIG. 4 is a schematic flow chart of an adaption algorithm according to a preferred embodiment of the present invention.

FIG. 4 shows main steps of the adaption algorithm. The method may start with an initial set of sending parameters as control instructions. In the original flow the devices D send image/video/point cloud streams to the server S (based on initial sending parameters set in the devices at the start). The server receives it, image processing is performed and the image processing result may be utilized further. This basic (and known) flow chart is shown in FIG. 4 on the left side.

As an addition to the original flow, the adaption mechanism is working in parallel (indicated by italic letter style in FIG. 4), which is depicted in FIG. 4 on the right. At the start the selected Key Performance Indicators (in the following abbreviated as KPIs) to measure, the KPI thresholds and the application preferences are set. The application preferences and KPI thresholds can be set according to the tables shown below.

In the first step, initial sending parameters are set in the devices D. The first step of the adaption algorithm is the measurement of the selected KPIs. The measurements are performed as the steps of the original flow are executed. KPIs can be measured and obtained from each step of the original flow (represented by dotted lines in FIG. 4).

Then as the application performance is measured, the performance metrics, which is represented in the performance measurement result, are added from the original flow to the adaption flow (represented by dotted lines in FIG. 4). Based on the performance metrics, the application priority and the application preferences the server application enforces or releases back-pressure on selected stream sources, namely on the devices D.

According to a preferred embodiment of the present invention, there exist different options to provide the performance metric. The KPIs performance metrics should be selected to reflect the overload conditions. If excessive amount of data is generated on the devices D and sent to the cloud server S, overload might occur in various points in the network or in the server S.

Regarding network overload, the best way to identify overload is by measuring end-to-end performance indicators by the application. One way of obtaining these indicators is that the devices D add meta information to the frames, e.g. timestamp of enqueuing the frames to send is added to all frames. The application on the server side then measures the timestamps of the reception of the frames, parses the reported timestamps in the received frames and determines if there is significant queueing delay in the network. When the difference between the timestamps of the reception of the frames (inter-arrival times) are larger than the difference between the corresponding timestamps indicated within the corresponding frames, then, queuing delay is identified somewhere in the network path, thus overload is detected.

Another way of detecting overload is to measure the performance of the function execution in the server S. For example, the execution time (latency) of the image processing function is measured. Performance degradation can be determined by comparing the latency to pre-set threshold values or by identifying change in the process.

The second step of the adaption algorithm is the rule based decision making. The rules consist of a condition and an action. The condition is based on KPIs and the action depends on application preferences (see the table referring to the application preferences below).

As for the condition of the rules, once the KPIs are measured, their values can be compared to the KPI threshold values set at the start (given in the KPI threshold table below). Performance degradation and performance improvement can be detected if the KPIs go below or above certain thresholds. The KPIs can be aggregated or can be per device values.

As for the action of the rules, increase and decrease of the load level can be initiated. The load levels are translated to settings of pre-defined parameters as shown in the table referring to the application preferences below).

In the third step of the adaption algorithm, sending parameters are updated in the devices D according to the decision made by in the previous step. The control loop closes this way, the devices D stream based on the updated (adapted) sending parameters and the flow starts again.

The implementation details of the adaption mechanism based on performance metrics, application priority and application preferences are not fixed in this application.

The following table shows the application preferences regarding the sending parameters:

TABLE

| | Application preferences | | | |
|---|---|---|---|---|
| | Sending parameters | | | |
| Load level | param_1 | param_2 | ... | param_n |
| 1 | value_11 | value_12 | ... | value_1n |
| 2 | value_2n | value_2n | ... | value_2n |
| ... | | | ... | |

The table shows different scenarios of sending parameters having different load levels. The load is in increasing order, 1 representing the lowest value. The sending parameters are e.g. framerate, resolution, field of view, etc. It is tradeoff for the application which parameter is preferred against the other. For example, in a computer vision application the resolution is a more important parameter than the framerate is. So, in this case decreasing load level would mean decreasing the framerate first. An example application preferences table is shown below.

The following KPI threshold table shows the table of the selected KPIs and their thresholds:

TABLE

| | KPI thresholds | | |
|---|---|---|---|
| KPI | KPI thresholds | | |
| KPI1 | thresh11 | thresh12 | ... |
| KPI2 | thresh21 | thresh22 | ... |
| ... | | ... | |

Multiple thresholds can be given for each KPI, that enables fine-tuning the rule set used in the decision-making process.

Figure 5:
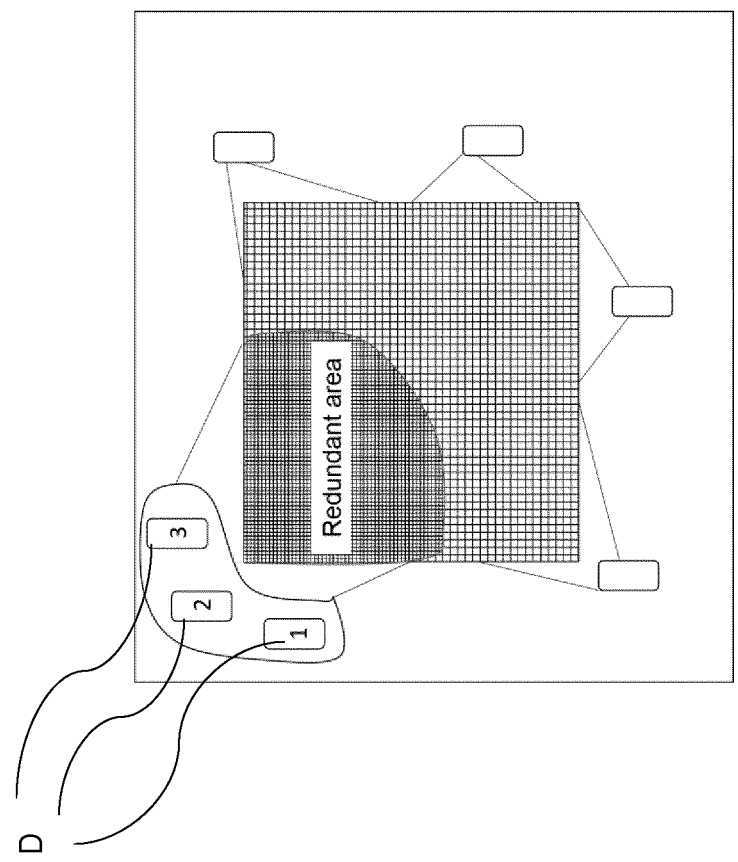
FIG. 5 represents a scenario with multiple depth cameras scanning partially overlapping or the same area.

FIG. 5 shows a scenario for applying the prioritizing algorithm in more detail. The received image data streams from the plurality of devices are aggregated on the server side. FIG. 5 shows the selected embodiment, which is a scenario where multiple devices D are located in the same physical environment (e.g. in a room) take point clouds with depth cameras and sent them to a central server S. It is highlighted in the upper left corner of FIG. 5 that devices D1,2,3 send point cloud from nearly the same view. Redundant information could be reduced if one or more devices D from this group would send lower amount of data. It can be achieved by either reducing the bitrate, the framerate or the resolution of the point cloud. If it is possible, even the field of view of the device can be adjusted to the application's needs. When the performance metrics get back to normal (pre-defined) values, then the back-pressure can be resolved.

With respect to FIG. 6, main steps of the invention are exemplified in the following embodiment. In the main flow of operation, depicted on the left side in FIG. 6, multiple devices D with depth cameras are perceiving the depth map of the actual scene from their view. The depth information is captured as a 3D point cloud. As soon as the point cloud is perceived in the device D, it is sent over to the server S. An application receives the point cloud stream from each device D. The application builds up and maintains the 3D model of the real environment and generates a polygonal mesh from the aggregated 3D point cloud. The actual 3D mesh built centrally in the server S is then used in AR application.

Figure 6:
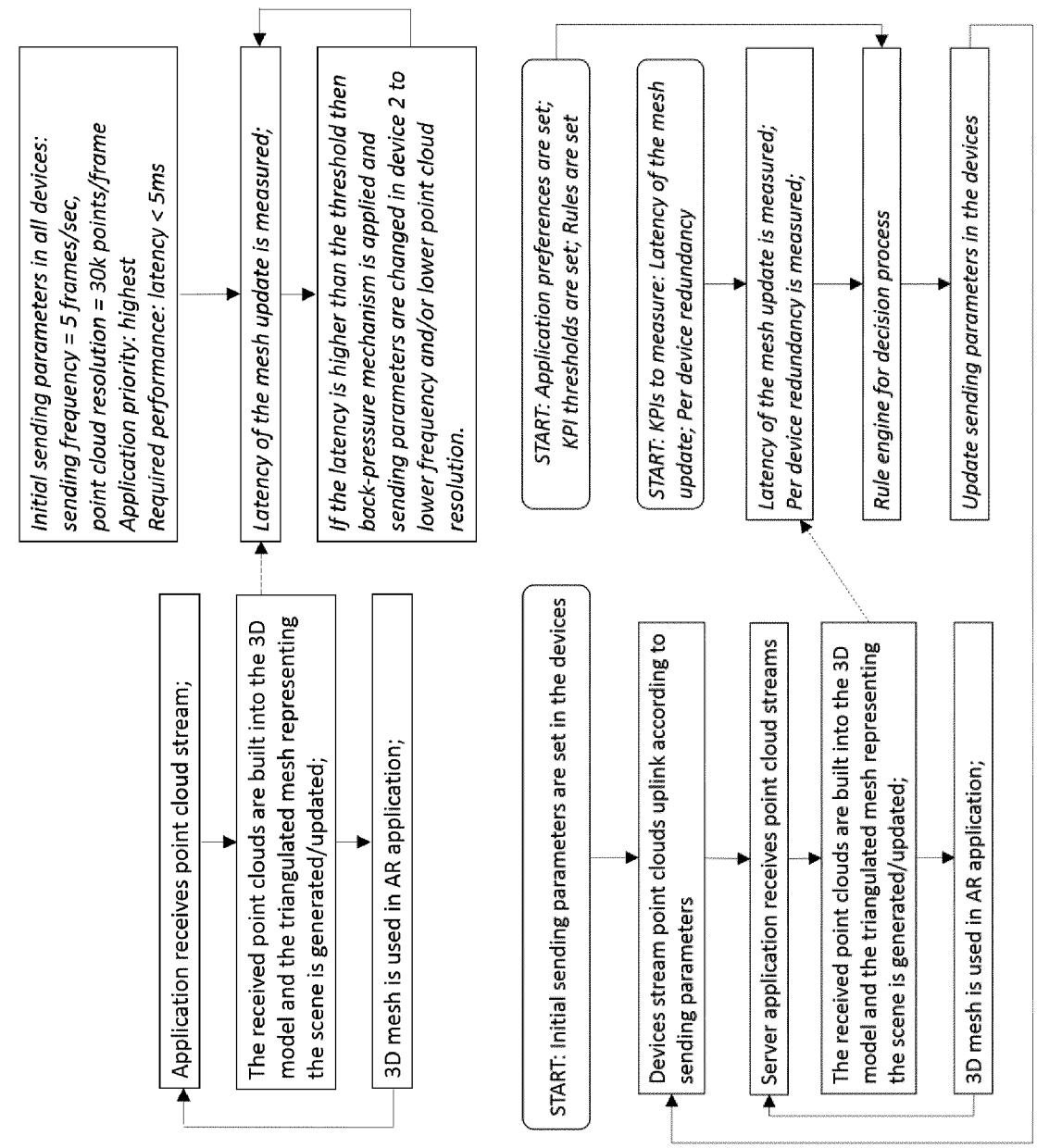
FIG. 6 is a schematic flow chart of a method according to another preferred embodiment of the present invention.

In parallel with the original flow, the adaption mechanism is working in the system, depicted on the right side, highlighted in italic in FIG. 6. First, initial sending parameters are set in the devices D. At the start, the KPIs to measure, the KPI thresholds, the application preferences and the rules are set. The exemplified application preference and example KPI threshold and example rule is shown in the respective tables below.

In the first step, as the 3D model is built up and the polygonal mesh is generated, the latency of the mesh update is measured. It is also measured for each device D how redundant the data they send. The redundancy measure is the ratio of irrelevant data they provide (i.e. that data is already provided from other devices).

In the second step, decision making is performed by the rules given in the rules table below. According to the first rule, if the measured latency is higher than e.g. 10 ms and the redundancy of a certain device is higher than 80%, then the load level of that device D is decreased. According to the second rule, if the measured latency is lower than 5 ms then the load level is increased for all devices D. The increase/decrease of the load level is translated to setting of the sending parameters as it is set in the application preference table (see above).

In the third step the server sends the updated sending parameters for the devices and the loop starts again, the devices D now stream based on the updated parameters.

The following example application preference table shows 5 different load levels and their corresponding sending parameters. In this specific case the resolution is preferred against the framerate, so if the load level should be decreased then the framerate is decreased first (load levels 5,4,3), after that if the load level should be decreased further then the resolution is decreased.

TABLE

Example application preferences

| | Sending parameters | |
|---|---|---|
| Load level | resolution (points/frame) | framerate (fps) |
| 1 | 10k | 5 |
| 2 | 20k | 5 |
| 3 | 30k | 5 |
| 4 | 30k | 30 |
| 5 | 30k | 100 |

The example KPI threshold table below shows the KPI thresholds given in the embodiment. Two thresholds are given for each KPI to enable hysteresis setting.

TABLE

Example KPI thresholds

| KPI | KPI thresholds | |
|---|---|---|
| Latency of mesh gen. (ms) | 5 | 10 |
| Per device redundancy (%) | 60 | 80 |

The example rule set table below consists of 2 basic rules. The first rule is for decreasing the load level in case of overload and redundancy, the second rule is for increasing the load level in case the performance became decent again. Additional rules can be added to the rule set, it is the task of the rule engine working in the decision process to merge these rules accordingly.

TABLE

Example rules set
Rule set

FOR EACH device i
IF(Latency of mesh gen. > thresh_12 AND Redundancy
(device i)>thresh_22) THEN
DECREASE Load level of device i
FOR EACH device i
IF(Latency of mesh gen. < thresh_11) THEN
INCREASE Load level of device i The proposed solution can be well applicable in a system supporting Internet of Things (IoT) where the IoT devices generate RGB images and/or 3D point clouds and send them to a server S. This solution provides an optimized way of setting the parameters for sending images/point clouds/video stream from the devices D to the server S, considering the application requirements and the footprint of the workload at the same time. The back-pressure method proposed herein assures that the network and the cloud services will not get overloaded due to highly redundant uplink data stream.

While the current invention has been described in relation to its preferred embodiments, it is to be understood that this description is for illustrative purposes only. For example, the device D may be a camera or another technical apparatus, for example being administered as surveillance system. Services may also refer to services that can be used in a broad set of business areas such as industry, gaming, entertainment, education, transport, public safety etc. For the person skilled in the art it is clear that the invention may also be used for other processings or services besides image processing. Also, the server needs not to be deployed as physical server or server farm. For example, it is also possible that the server side functionality (application, image processing functions and the backpressure mechanism) described above can be hosted in a virtualized environment as well. Accordingly, it is intended that the invention be limited only by the scope of the claims appended hereto.

The invention claimed is:

1. A method performed by a server running an application, wherein the method comprises:
   receiving a plurality of uplink data streams in real time from a corresponding plurality of devices, for processing by the application;
   identifying redundant devices among the plurality of devices, wherein any one of the devices is considered redundant based on determining that the uplink data stream from the device contains data being provided by one or more other ones of the devices; and
   applying a prioritizing algorithm that determines one or more adaptations to be implemented at one or more of the redundant devices, according to a prioritization of the redundant devices, the one or more adaptations changing ongoing data acquisition or data transmission to lower information redundancy in the plurality of uplink data streams.

2. The method according to claim 1, wherein the application is an image processing application and the plurality of uplink data streams is a plurality of video streams, and wherein the prioritizing algorithm prioritizes the redundant devices according to at least one of: video framerates of the respective video streams, video resolutions of the respective video streams, bitrates of the respective video streams, and whether respective ones of the redundant devices are fixed cameras or mobile cameras.

3. The method according to claim 1, wherein the one or more adaptations comprise at least one targeted adaptation for at least one targeted redundant device among the one or more redundant devices, and wherein the method further comprising, for each targeted redundant device, indicating the targeted adaptation, whereupon the targeted redundant device generates a control instruction to implement the targeted adaptation.

4. The method according to claim 1, wherein uplink streaming parameters are controlled in a dedicated manner specifically for each device in the plurality of devices, such that the one or more adaptations to be implemented at the one or more of the redundant devices comprise per-device adaptations.

5. The method according to claim 1, wherein the uplink data streams comprise depth information streamed by each device as a three-dimensional (3D) point cloud, and wherein the prioritizing algorithm is based on a 3D mesh model that is calculated dynamically from the 3D point clouds received from differently located ones among the plurality of devices.

6. The method according to claim 1, wherein the method further comprises determining one or more further adaptations to be implemented at one or more of the devices, the one or more further adaptations computed as a function of processing load at the server and changing ongoing data acquisition or data transmission to lower a processing load at the server.

7. A server comprising a processing unit configured to:
   receive a plurality of uplink data streams in real time from a corresponding plurality of devices, for processing by an application running on the server;
   identify redundant devices among the plurality of devices, wherein any one of the devices is considered redundant based on determining that the uplink data stream from the device contains data being provided by one or more other ones of the devices; and apply a prioritizing algorithm that determines one or more adaptations to be implemented at one or more of the redundant devices, according to a prioritization of the redundant devices, the one or more adaptations changing ongoing data acquisition or data transmission to lower information redundancy in the plurality of uplink data streams.

8. The system according to claim 7, wherein the application is an image processing application and the plurality of uplink data streams is a plurality of video streams, and wherein the prioritizing algorithm prioritizes the redundant devices according to at least one of: video framerates of the respective video streams, video resolutions of the respective video streams, bitrates of the respective video streams, and whether respective ones of the redundant devices are fixed cameras or mobile cameras.

9. The system according to claim 7, wherein the one or more adaptations comprise at least one targeted adaptation for at least one targeted redundant device among the one or more redundant devices, and wherein the method further comprises, for each targeted redundant device, indicating the targeted adaptation, whereupon the targeted redundant device generates a control instruction to implement the targeted adaptation.

10. A non-transitory computer-readable medium storing a computer program comprising instructions that, when executed by a processor of a server, configures the server to:

receive a plurality of uplink data streams in real time from a corresponding plurality of devices, for processing by an application running on the server;

identify redundant devices among the plurality of devices, wherein any one of the devices is considered redundant based on determining that the uplink data stream from the device contains data being provided by one or more other ones of the devices; and apply a prioritizing algorithm that determines one or more adaptations to be implemented at one or more of the redundant devices, according to a prioritization of the redundant devices, the one or more adaptations changing ongoing data acquisition or data transmission to lower information redundancy in the plurality of uplink data streams.

\* \* \* \* \*